US010015521B2

(12) United States Patent
Fishwick

(10) Patent No.: US 10,015,521 B2
(45) Date of Patent: Jul. 3, 2018

(54) ERROR DETECTION IN A MOTION ESTIMATION SYSTEM

(71) Applicant: Imagination Technologies Limited, Kings Langley (GB)

(72) Inventor: Steven Fishwick, Kings Langley (GB)

(73) Assignee: Imagination Technologies Limited, Kings Langley (GB)

( * ) Notice: Subject to any disclaimer, the term of this patent is extended or adjusted under 35 U.S.C. 154(b) by 257 days.

(21) Appl. No.: 14/732,450

(22) Filed: Jun. 5, 2015

(65) Prior Publication Data

US 2015/0365706 A1 Dec. 17, 2015

(30) Foreign Application Priority Data

Jun. 17, 2014 (GB) .................................. 1410774.2

(51) Int. Cl.
| | |
|---|---|
| *H04N 19/895* | (2014.01) |
| *H04N 19/65* | (2014.01) |
| *H04N 19/587* | (2014.01) |
| *H04N 19/52* | (2014.01) |
| *H04N 19/182* | (2014.01) |
| *H04N 19/513* | (2014.01) |
| *H04N 19/176* | (2014.01) |

(52) U.S. Cl.
CPC .......... *H04N 19/65* (2014.11); *H04N 19/521* (2014.11); *H04N 19/52* (2014.11)

(58) Field of Classification Search
None
See application file for complete search history.

(56) References Cited

U.S. PATENT DOCUMENTS

| | | | | |
|---|---|---|---|---|
| 5,832,124 | A * | 11/1998 | Sato ...................... | H04N 19/30 348/445 |
| 7,667,778 | B2 * | 2/2010 | Yoshiwara ............ | G06T 3/4007 348/699 |
| 2005/0190844 | A1 * | 9/2005 | Kadono ........... | H04N 21/41422 375/240.16 |
| 2006/0120453 | A1 * | 6/2006 | Ikeda .................. | H04N 19/105 375/240.16 |
| 2006/0193388 | A1 * | 8/2006 | Woods ................ | H04N 19/647 375/240.16 |
| 2006/0209960 | A1 * | 9/2006 | Katayama ............. | H04N 19/61 375/240.16 |
| 2006/0262853 | A1 | 11/2006 | Li et al. | |
| 2008/0285652 | A1 * | 11/2008 | Oxman ................. | H04N 19/61 375/240.16 |

(Continued)

*Primary Examiner* — Kate Luo

(74) *Attorney, Agent, or Firm* — Vorys, Sater, Seymour and Pease LLP; Vincent M DeLuca

(57) ABSTRACT

Errors in a double-ended motion estimation system are detected. An image space is divided into blocks, and a motion vector is derived for each block. The space is also divided into indication blocks. Each motion vector is used to identify one or more indication blocks, in which a value is modified. In an example, a backward component of the motion vector is used to project a source flag into one indication block, and a forward component of the motion vector is used to project a destination flag into another indication block. After processing each motion vector, an indication block with no flags set is indicative of pixel data that has not been tracked, and therefore indicative of a motion estimation error. Remedial action may then be taken.

20 Claims, 14 Drawing Sheets

(56) References Cited

U.S. PATENT DOCUMENTS

| | | | | |
|---|---|---|---|---|
| 2009/0147853 A1* | 6/2009 | Dane | ..................... | H04N 5/145 375/240.16 |
| 2009/0207315 A1* | 8/2009 | Ikeda | ..................... | H04N 5/144 348/699 |
| 2010/0225768 A1* | 9/2010 | Incesu | ..................... | H04N 5/145 348/180 |
| 2010/0277644 A1* | 11/2010 | Blume | ................. | H04N 7/0132 348/452 |
| 2013/0101041 A1* | 4/2013 | Fishwick | ............... | H04N 19/56 375/240.16 |
| 2013/0301735 A1* | 11/2013 | Sugio | ..................... | H04N 19/52 375/240.16 |
| 2013/0301736 A1* | 11/2013 | Sugio | ..................... | H04N 19/52 375/240.16 |

* cited by examiner

ERROR DETECTION IN A MOTION ESTIMATION SYSTEM

BACKGROUND

Many video processing systems require knowledge of the way that parts of the image move between one frame and the next. The process of determining the motion is known as motion estimation. A common motion estimator is the block-based type, in which a frame of video is divided into a number of blocks, and for each block a vector is found that represents the motion of the pixels in that block.

FIG. 1 shows an example block-based single-ended motion estimator. An image 100 is divided into a regular array of blocks 105, and motion estimation proceeds for each block in turn. Also shown is a moving object 110 at a certain position in one frame of a video sequence, and, superimposed onto the same figure, the same object 115, at its position in the previous frame in the sequence. The image data in block 120 contains a number of pixels representing part of object 110. Motion estimation for block 120 involves searching the previous frame in the sequence to find the area of image data with contents most similar to the contents of block 120. Assuming that the motion estimation performs well, the area 125 is found. It can be seen that area 125 is the same size as block 120, but is not aligned to the grid 105. The position of the area of matching pixels 125, relative to block 120, determines motion vector 130 which reflects the motion of object 110, and is said to be the motion vector of block 120.

Single-ended motion estimation works well in some applications, such as video encoding, since it produces one vector for each block, such as 120, in each frame 100 that is encoded.

Another application for motion estimation is a motion compensated frame rate converter. In this application it is necessary to produce an interpolated frame at an intermediate position between two existing source frames in a video sequence. FIG. 2 shows the motion estimation result from FIG. 1, being used to interpolate image data in a new frame mid-way between two source frames from the original video sequence. Motion estimation for block 120 determines motion vector 130, and pixels for a new area of image 200, positioned at the midpoint of the vector, are derived from the pixels in block 120 and from the pixels in area 125. Notice that the interpolated area 200 is not necessarily aligned to the block grid.

FIG. 3 illustrates a problem that may arise when using single-ended vectors in a frame rate converter. Objects 300 and 305 are moving at different speeds, giving rise to unequal motion vectors 320 and 325 for the blocks 310 and 315 respectively. In this example the vectors are converging. Interpolation of a new frame involves the creation of pixel data in areas 330 and 335, at the mid-points of the two vectors. Blocks 310 and 315 are adjacent, but the interpolated areas, 330 and 335 are not. This leads to a hole, 340, in the interpolated image. An alternative situation exists where vectors diverge, leading to overlap of interpolated areas. In either case, some effort is required to resolve holes and overlap areas, in order to produce an output image with one value at each pixel position.

FIG. 4 shows an example of double ended motion estimation. When used in the example application of a frame rate converter, this type of motion estimation has the significant advantage of producing exactly one value for each pixel position in the interpolated frame. The frame to be interpolated, 400, is divided into a regular array of blocks, 405, and motion estimation takes place for each block in turn. Motion estimation for block 405 involves searching the previous and next frames in the sequence for areas of image data that are most similar to each other. The search is constrained, in this example, by requiring that the offsets of the areas tested are equal in magnitude and opposite in direction with respect to the position of the block in the interpolated frame. In this example, the best match is found between area 410 in the previous frame and area 415 in the next frame, both of which are shown superimposed onto the grid of blocks in the interpolated frame. Note that neither area is necessarily aligned with the grid. The forward offset 420 is equal to the backward offset 425. In combination the two offsets may be said to be the motion vector of block 405, and represent the motion of an object in the interval between the two source frames. In the figures, where double ended motion vectors are shown, the component corresponding to the forward offset (such as 420) is shown with an open arrow head, and the component corresponding to the backward offset (such as 425) is shown with a solid arrow head.

Interpolation of pixel data in block 405 requires that pixel data be derived from pixel data in one or both of the areas 410 and 415. The alignment of the grid to the interpolated frame means that exactly one value is produced for each pixel position.

The example of FIG. 4 shows interpolation occurring at the temporal mid-point between two source frames. In frame rate conversion it is common that other interpolation phases are required, for example interpolation at one quarter of the interval between source frames. In such a situation several possibilities exist, one of which is illustrated in FIG. 5. A block 500 is motion estimated and interpolated using a method similar to that illustrated in FIG. 4. However, it is known that interpolation at one quarter of the frame interval is required, and so the offsets are scaled, before they are tested, such that the forward offset 505 is three times the size of the backward offset 510. The scaled offsets are then used in motion estimation and interpolation. This gives correct interpolation of object 515. Should further interpolations be required, for example at half and three-quarter intervals, further motion estimations are performed with forward and backward offset sizes adjusted accordingly.

Occluded and revealed areas of image present a problem for any motion estimation system, and particularly for a system using double-ended vectors. A common example occurs where an object moves across a background. At the leading edge of the moving object parts of the background are occluded, and at the trailing edge of the moving object parts of the background are revealed.

In a video encoder, it is not always necessary for motion vectors to reflect the actual motion of objects in the scene, provided that the vectors provide good pixel matches and therefore allow effective compression of the video. In a frame rate converter, however, an interpolated frame is created by rendering image data at intermediate positions determined by the motion vectors. It is therefore much more important that the motion vectors represent the true motion of the objects in the scene.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A technique is described for detecting errors in a double-ended motion estimation system. The screen is divided into blocks, and a motion vector is derived for each block. The screen is also divided into indication blocks. Each motion vector is used to identify one or more indication blocks, in which a value is modified. In an example, the backwards component of the motion vector is used to project a source flag into one indication block, and the forwards component of the motion vector is used to project a destination flag into another indication block. After processing each motion vector, an indication block with no flags set is indicative of pixel data that has not been tracked, and therefore of a motion estimation error. Remedial action may then be taken. Variations are described in which the indication blocks store different types of value. Examples are also described for handling image edges.

According to a first aspect of the invention there is provided a method of error detection in a motion estimation system having an image space divided into a plurality of estimation blocks and a plurality of indication blocks, the method comprising: initialising, in a memory, a plurality of indicator values, wherein each indication block is associated with at least one of the indicator values; receiving a motion vector for a selected one of the estimation blocks; identifying an indication block from the location of the selected estimation block and a component of the motion vector; modifying an indicator value in the memory associated with the identified indication block; and analysing the plurality of indicator values to detect a motion estimation error at an associated indication block and performing error concealment in dependence thereon.

The motion vector received for a selected one of the estimation blocks may have a forwards component and a backwards component.

The step of identifying an indication block may comprise: identifying the indication block from one of the forwards component or backwards component of the motion vector.

The method may further comprise: identifying a further indication block from an opposite component of the motion vector to that used to identify the identified indication block.

Each indicator block may be associated with a first and second indicator value, and the step of modifying an indicator value in the memory associated with the identified indication block may comprise: modifying the first indicator value associated with the identified indication block if the indication block was identified from the forwards component of the motion vector; and modifying the second indicator value associated with the identified indication block if the indication block was identified from the backwards component of the motion vector.

The step of analysing the plurality of indicator values to detect a motion estimation error at an associated indication block may comprise determining that both the first indicator value and the second indicator value for the associated indication block satisfy a predefined condition.

The step of identifying an indication block may comprise deriving a location by adding the component of the motion vector to the location of the estimation block.

The step of identifying an indication block may further comprise rounding the derived location to the nearest indication block.

The step of identifying an indication block may further comprise identifying one or more further indication blocks adjacent to the nearest indication block in accordance with the derived location.

The step of identifying an indication block may comprise identifying an indication block overlapped by an estimation block sized area at the location derived by adding the component of the motion vector to the location of the estimation block.

The step of modifying an indicator value may comprise modifying the value in dependence on the area of overlap between the estimation block sized area and the identified indication block.

The method may further comprise: determining a first set of indication blocks at least partially overlapping in the image space with estimation blocks having a motion vector with a component that points outside the image space; determining a second set of indication blocks at least partially overlapping in the image space with estimation blocks having a motion vector with a corresponding component that does not point outside the image space; and copying at least a portion of the indicator values associated with the second set of indication blocks into the corresponding indicator values associated with the first set of indication blocks.

The step of analysing the plurality of indicator values to detect a motion estimation error may comprise: determining a set of indication blocks at least partially overlapping in the image space with estimation blocks having a motion vector with a component that points outside the image space; and disregarding unmodified indicator values associated with the set of indication blocks in the error detection.

According to a second aspect of the invention there is provided an error detector in a motion estimation system having an image space divided into a plurality of estimation blocks, and a plurality of indication blocks, the error detector comprising: a memory configured to store a plurality of indicator values, wherein each indication block is associated with at least one of the indicator values; an interface configured to receive a motion vector for a selected one of the estimation blocks; projection logic configured to identify an indication block from the location of the selected estimation block and a component of the motion vector; update logic coupled to the memory and configured to modify an indicator value in the memory associated with the identified indication block; detection logic configured to analyse the plurality of indicator values to detect a motion estimation error at an associated indication block; and concealment logic configured to perform error concealment in dependence on the detected motion estimation error.

The motion vector received at the interface may have a forwards component and a backwards component.

The projection logic may be configured to identify the indication block from one of the forwards component or backwards component of the motion vector.

The projection logic may be further configured to identify a further indication block from an opposite component of the motion vector to that used to identify the identified indication block.

Each indicator block may be associated with a first and second indicator value, and the update logic may be configured to: modify the first indicator value in the memory associated with the identified indication block if the indication block was identified from the forwards component of the motion vector; and modify the second indicator value in the memory associated with the identified indication block if the indication block was identified from the backwards component of the motion vector.

The detection logic may be configured to detect a motion estimation error at an associated indication block by determining that both the first indicator value and the second indicator value for the associated indication block satisfy a predefined condition.

The projection logic may be configured to identify an indication block by deriving a location from the addition of the component of the motion vector to the location of the estimation block.

The projection logic may be further configured to round the derived location to the nearest indication block.

The projection logic may be further configured to identify one or more further indication blocks adjacent to the nearest indication block in accordance with the derived location.

The projection logic may be configured to identify an indication block overlapped by an estimation block sized area at the derived location.

The update logic may be configured to modify an indicator value in dependence on the area of overlap between the estimation block sized area and the identified indication block.

The error detector may further comprise screen edge logic, wherein the screen edge logic may comprise: vector comparison logic configured to determine a first set of indication blocks at least partially overlapping in the image space with estimation blocks having a motion vector with a component that points outside the image space, and a second set of indication blocks at least partially overlapping in the image space with estimation blocks having a motion vector with a corresponding component that does not point outside the image space; and extrapolation logic configured to copy at least a portion of the indicator values associated with the second set of indication blocks into the corresponding indicator values associated with the first set of indication blocks.

The error detector may further comprise screen edge logic, wherein the screen edge logic may comprise vector comparison logic configured to determine a set of indication blocks at least partially overlapping in the image space with estimation blocks having a motion vector with a component that points outside the image space; and the detection logic may be configured to disregard unmodified indicator values associated with the set of indication blocks.

According to another aspect, there is provided computer readable code adapted to perform the steps of the method when the code is run on a computer. A computer readable storage medium may have encoded thereon the computer readable code.

According to another aspect, there is provided computer readable code for generating a video processing system comprising the error detector. A computer readable storage medium may have encoded thereon computer readable code for generating a video processing system comprising the error detector.

The above features may be combined as appropriate, as would be apparent to a skilled person, and may be combined with any of the aspects of the examples.

BRIEF DESCRIPTION OF THE DRAWINGS

Examples will now be described in detail by way of reference to the accompanying drawings in which.

Figure 1:
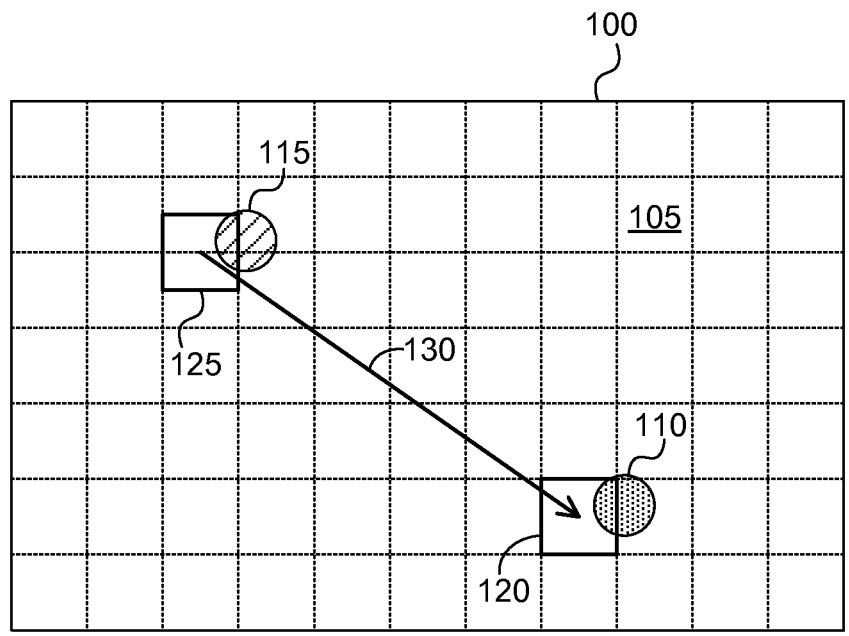
FIG. 1 shows an example of a single-ended block-matching motion estimation system.
Figure 2:
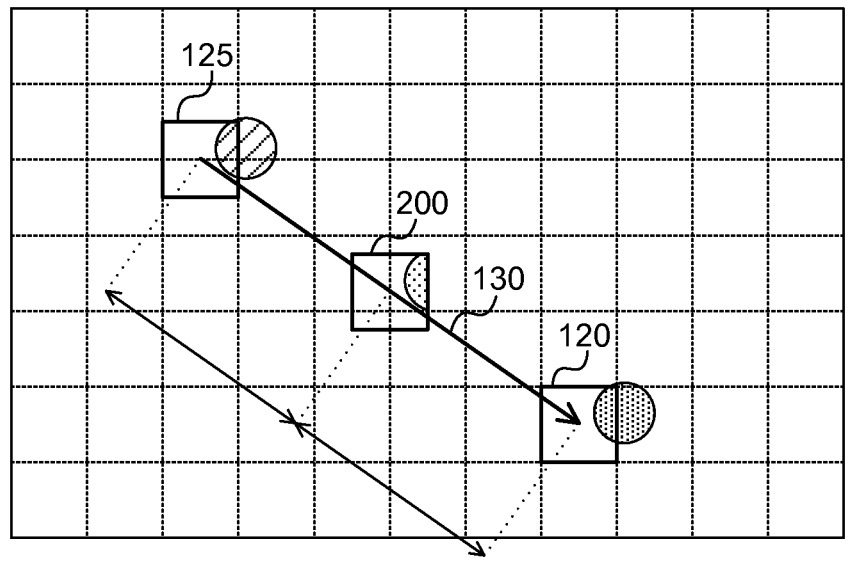
FIG. 2 shows an example of interpolation at the mid-point of a single-ended motion vector.
Figure 3:
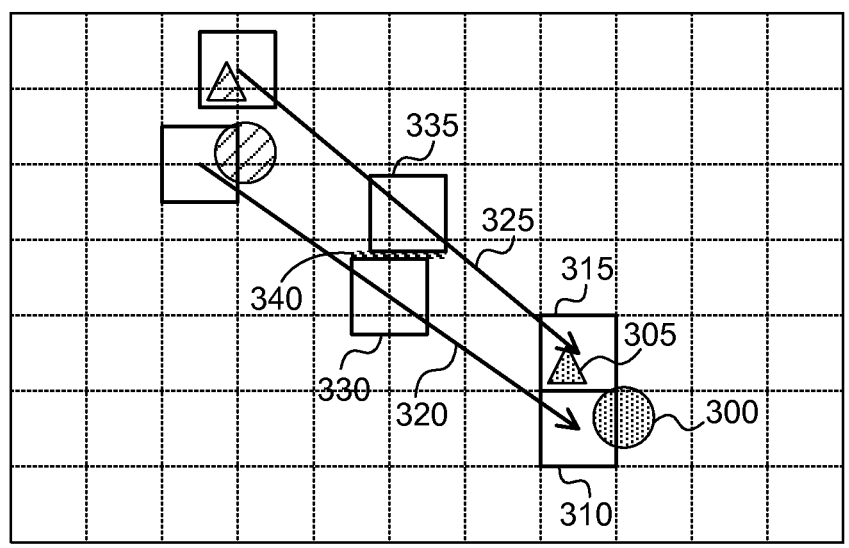
FIG. 3 illustrates a problem that may arise when interpolating an image at the mid-points of converging single-ended vectors.
Figure 4:
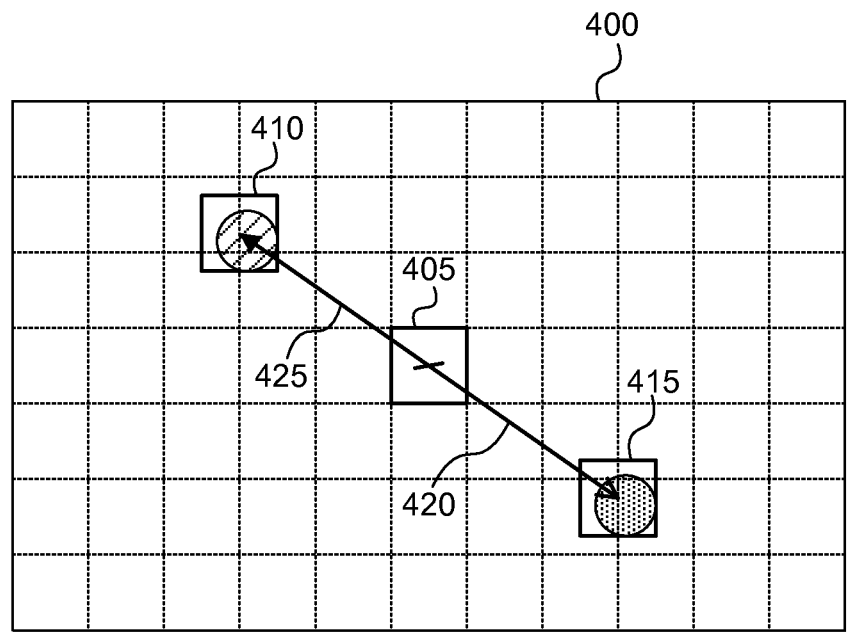
FIG. 4 shows an example of interpolation at the mid-point of a double-ended motion vector.
Figure 5:
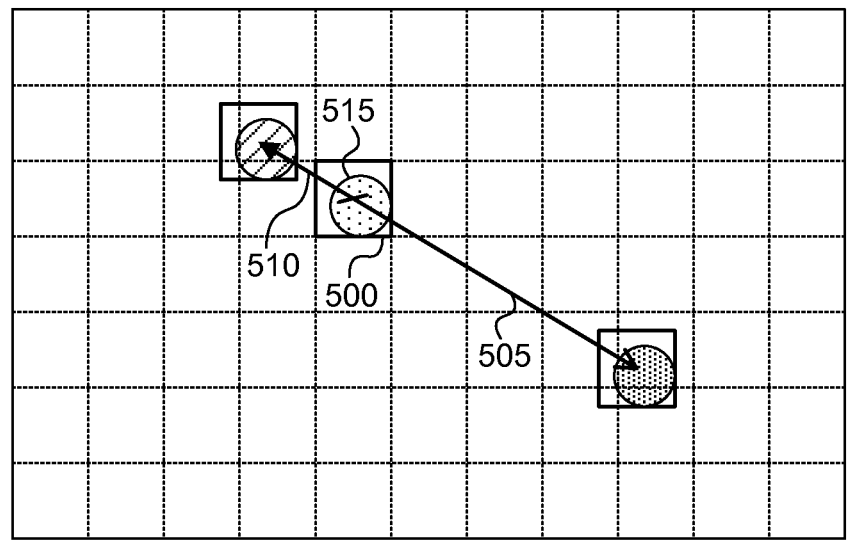
FIG. 5 shows two possible methods of double-ended interpolation, at intervals other than the mid-points of the vectors.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures to indicate similar features.

DETAILED DESCRIPTION

Embodiments will now be described by way of example only.

Figure 6:
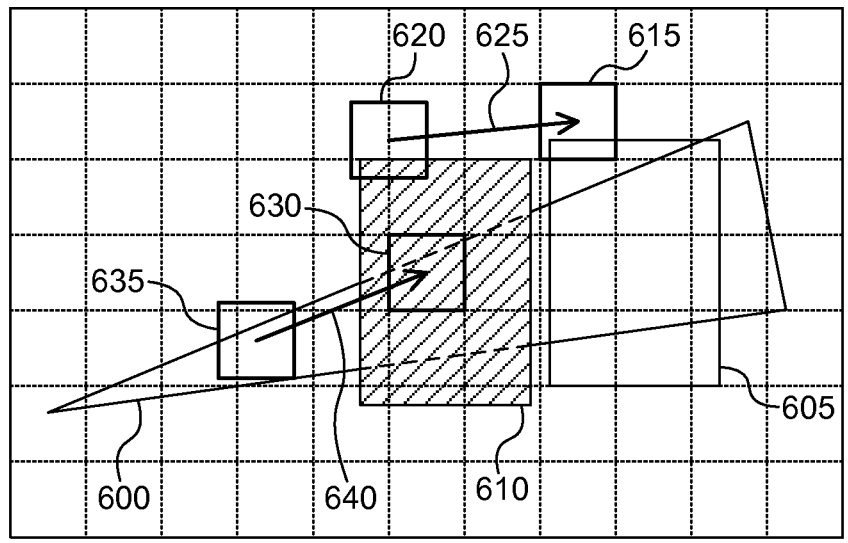
FIG. 6 shows an example of occlusion in a single-ended motion estimation system.

FIG. 6 shows an example of a revealed area in a single-ended motion estimator. The background of the scene is static and contains triangular object 600. Object 605 is in the foreground and is moving from left to right. In the previous frame of the sequence, the same object was in the position shown by the shaded rectangle 610. Motion estimation for block 615 is straightforward. The contents of the block are found in area 620 of the previous frame, and so motion vector 625 is assigned to block 615. Motion estimation for block 630 is complicated by the fact that the background in this area has just been revealed by the motion of object 605. In the current frame, the pixel data for block 630 contains part of the upper edge of triangle 600. The background, including object 600, is not moving, and so it is clear that block 630 should be assigned a zero vector. However, in the previous frame, the area of pixels co-located with block 630 contains the image of moving object 610. The zero vector provides a poor pixel match and is unlikely to be selected. In general, the vectors assigned in an occluded or revealed area contain an assortment of next-best matches. In FIG. 6, block 630 has found a match in the contents of area 635, an area of background that is not occluded in the previous frame. Consequently, incorrect vector 640 has been selected.

It is important to appreciate that although a motion vector may be considered "correct" in that it accurately describes the true motion in the scene or "incorrect" in that it does not accurately describe the true motion in the scene, many motion estimators do not have such a concept as this cannot be readily understood by a machine in the way that it can by a human. Instead, the motion estimators are looking for a "good" pixel match. Therefore, in the above example, vector 640 is considered to be a "good" vector as it has a good pixel match, even though it would be considered incorrect as far as the true motion is concerned.

Figure 7:
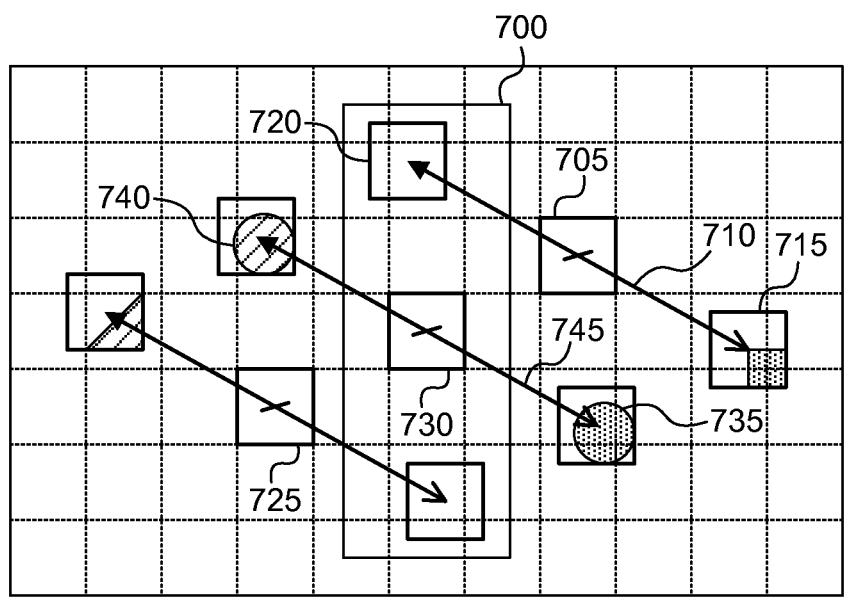
FIG. 7 shows several examples of occlusion in a double-ended motion estimation system.

FIG. 7 shows examples of occlusion problems that are specific to systems using double ended vectors. The scene consists of a foreground object 700 which is not moving. The background is moving uniformly from top left to bottom right, with motion that would be correctly described by vector 710. Ideally, motion estimation for block 705 would select vector 710, since block 705 is part of the background. However, in order to select this vector, the motion estimator would be required to find a good match between the areas of pixel data at 715 and 720. This match cannot be found, because the background is occluded by object 700 in area 720. As a result the motion estimator is unlikely to select vector 710, but some other vector that provides a good pixel match, but which does not reflect the true motion of the image. A very similar situation can be seen to exist for block 725. For this reason it is likely that the motion vector field produced by a double ended motion estimator will contain regions of bad vectors in the areas adjacent to an occluding object.

Another situation is illustrated in FIG. 7, where a motion vector for block 730 cannot be determined with confidence. The moving object, 735 in the next frame, and 740 in the previous frame, suggests the motion vector 745. The motion estimator, having determined that a similar vector is appropriate in non-occlusion background areas of the image may strongly favour this choice. Selection of vector 745 would result in object 735 being interpolated in block 730. Alternatively, since object 700 is not moving, a zero vector might be selected for block 730. In this case, object 735 would not be interpolated in the block. It is not clear which solution is correct. Object 735 may be part of the background, passing behind object 700, or it may be a foreground object, passing in front of object 700. In general it is difficult to reliably make the correct vector selection without an understanding of the structure of the scene which conventional motion estimators are unlikely to possess.

A motion compensated frame rate converter using double-ended vectors may suffer from any of the problems illustrated in FIG. 7. The output from a frame rate converter typically comprises a series of source frames and interpolated frames according to the ratio of input frame rate to output frame rate. Source frames are typically output unmodified, and therefore contain no artefacts due to motion estimation errors, while interpolated frames may contain artefacts due to the motion estimation problems discussed above.

In one example system, the input frame rate is doubled by outputting one interpolated frame between each pair of input frames. In the example of block 730, an incorrect motion vector may cause object 735 to be visible where it should not be, or to be invisible where it should be visible. In either case, the output video sequence will appear to flicker, as the output frames alternate between interpolated frames with and source frames without the artefact caused by the incorrect vector. In some cases the flickering effect will draw the viewer's attention to interpolation artefacts that would otherwise have gone unnoticed.

A technique for detecting situations in which flickering may occur allows measures to be taken to prevent it, or to reduce its visibility. In one example of the technique indicators, such as flags, are associated with each block of the interpolated frame to indicate whether the block is the source of, and/or the destination of, pixel data in either the previous or next frame respectively.

Figure 8:
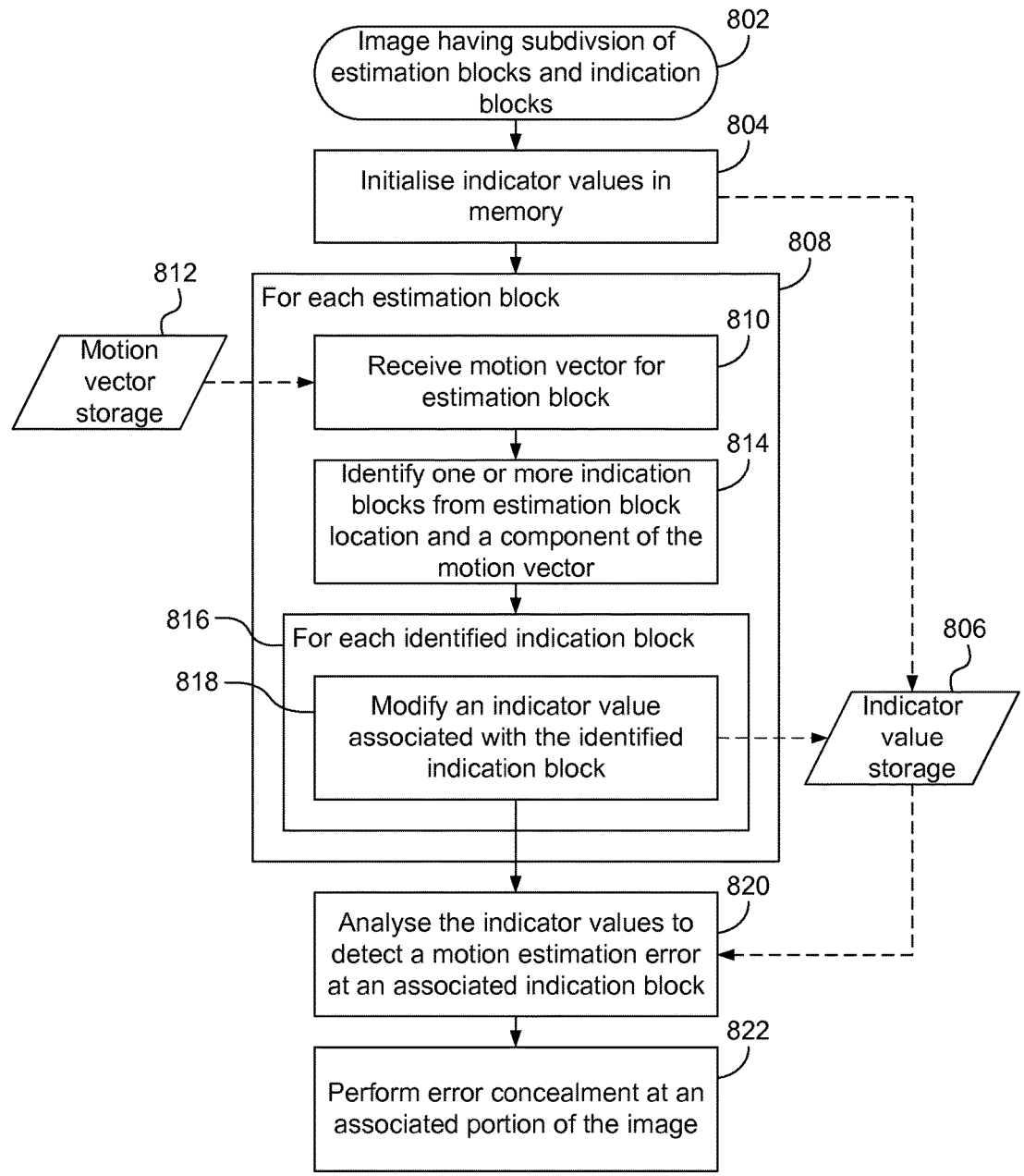
FIG. 8 shows a flow diagram of an error detection method.

FIG. 8 illustrates an example flowchart of a method for detecting motion estimation errors, such as those that can cause flickering as described above. The method operates on a frame or image 802 in which the image space has been subdivided into a plurality of estimation blocks (such as blocks 105) and also a plurality of indication blocks. Estimation blocks and indication blocks are shown as being square in all figures, but other shapes may be used. Possible block shapes may include rectangular, hexagonal, or triangular. The indication blocks may have the same shape, size and alignment as the estimation blocks, or they may be shaped, sized and/or aligned differently from the estimation blocks, as outlined below.

In step 804, a plurality of indicator values are initialised in a memory acting as indicator value storage 806. Each indication block is associated with at least one indicator value in the memory. In some examples described below, each indicator block is associated with two indicator values (e.g. a source and destination indicator values as outlined hereinafter). Conceptually, the indicator values can be viewed as an array or plane of values corresponding to the indication blocks. However, in reality they may be stored in memory in any form or order. In an example, the indicator values may be initialised to zero.

Multi-step 808 is performed for each estimation block in the image. For a selected estimation block, a motion vector is received in sub-step 810. The motion vector may have been calculated using motion estimation as described above, and stored in motion vector storage 812. The motion vector may be a single-ended vector or a double-ended vector.

In sub-step 814 one or more indication blocks are identified based on the location of the selected estimation block and a component of the motion vector. For example, in the case of a double-ended motion vector, an indication block may be identified using either the forward or backward component of the vector. In this example, a first indication block may be identified using the forward component, and a second indication block may be identified using the backward component. The indication block may be identified by determining which indication block the motion vector (or one component thereof) points to when originating from the estimation block. Several more detailed examples are given below for how the indication block can be identified.

For each identified indication block (sub-step 816), an indicator value is modified in sub-step 818 in dependence on the indication block identified. In other words, one of the indicator values associated with the identified indication block is modified. Several options for how the indicator value associated with the identified indication block is modified are described below. The determination of which indicator value associated with the identified indication is modified may depend upon the component of the motion vector used to identify the indication block. The indicator values are modified by updating the indicator value storage 806.

Once the processes in multi-step 808 have been performed for each estimation block, then a full set of indicator values have been updated for the image. The indicator values stored in the indicator value storage 806 can then be read and analysed in step 820 to detect whether a motion estimation error is present at an associated indication block. Several examples for detecting the presence of an error (or a high likelihood thereof) are described below. When an error has been detected, then error concealment may be performed in step 822 to mitigate or reduce the effects of the error.

Figure 9:
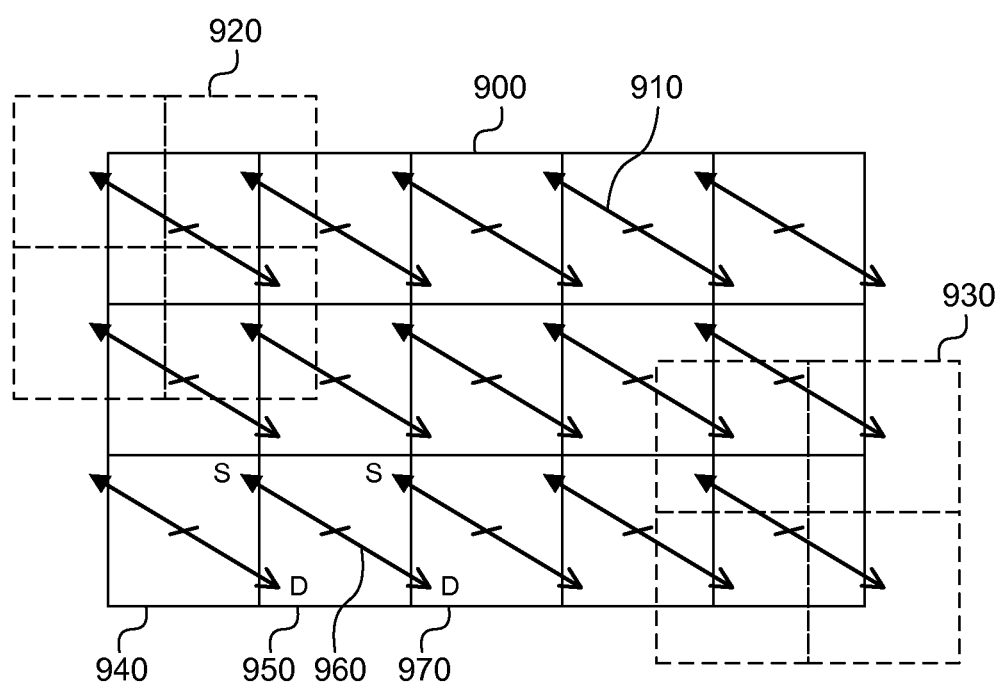
FIG. 9 shows an example of a uniform vector field, with examples of source and destination flags.
Figure 10A:
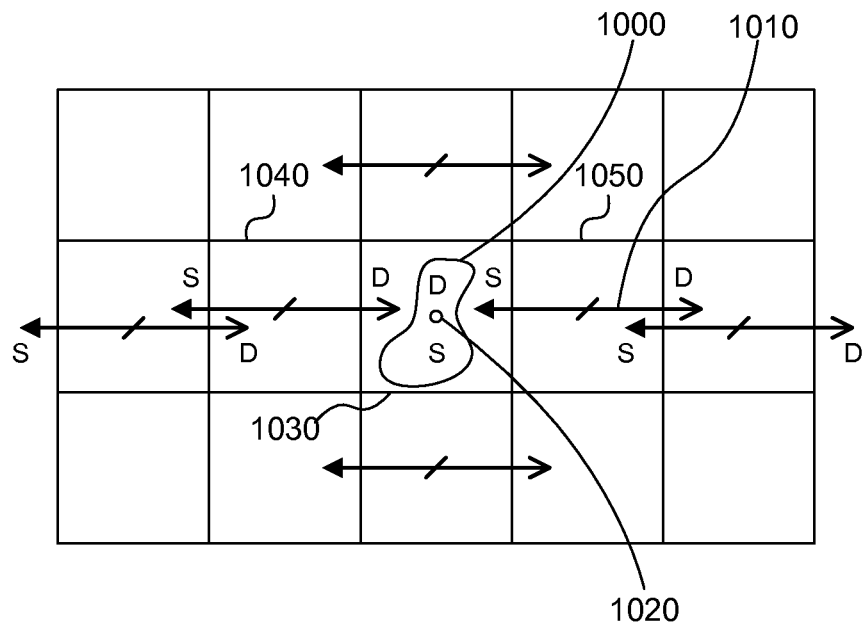
FIG. 10a shows an example of a uniform vector field with an occluding object, and examples of source and destination flags.
Figure 10B:
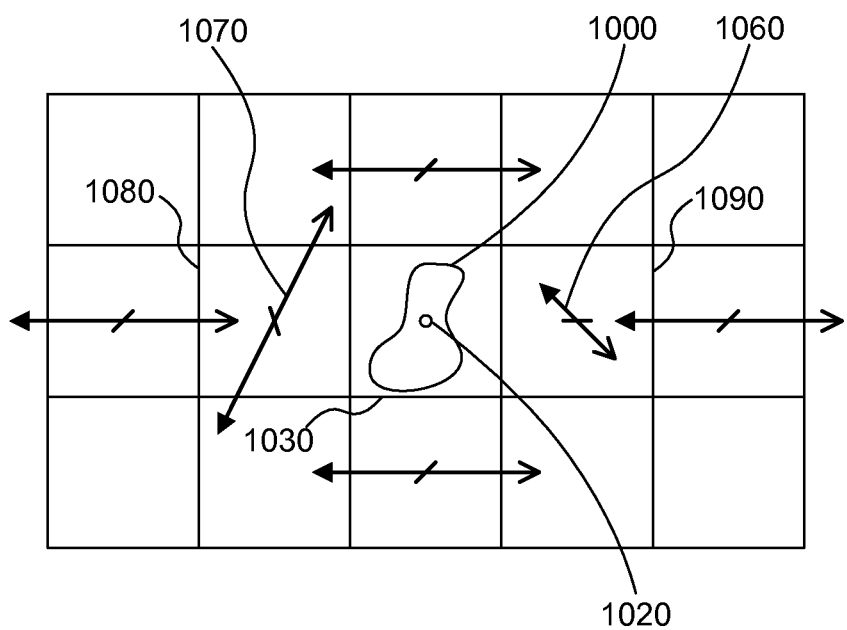
FIG. 10b shows an example of erroneous vectors close to an occluding object.
Figure 11:
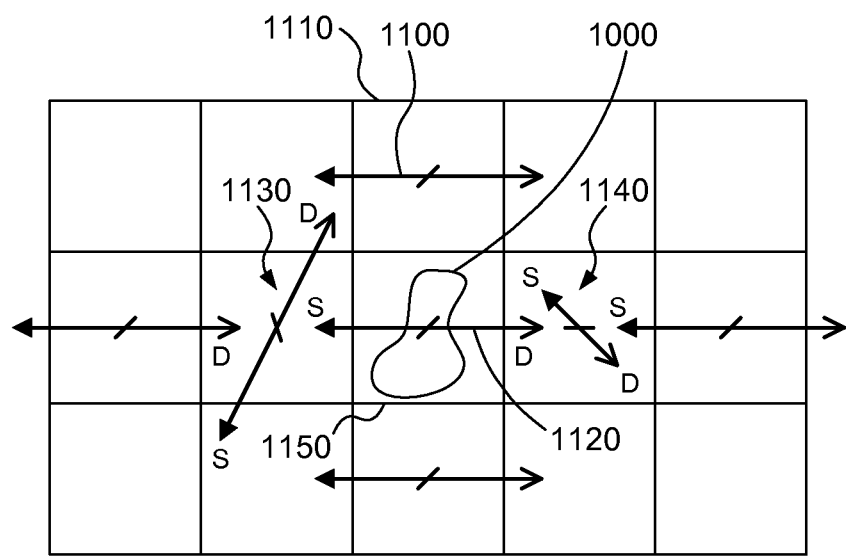
FIG. 11 shows a further example of erroneous vectors close to an occluding object, and examples of source and destination flags.

FIGS. 9 to 11 will now be used to illustrate different example scenarios, and how the indicators can be used to identify potential flicker problems.

FIG. 9 shows an example frame 900 where motion estimation has produced a uniform vector field. Motion vectors such as 910 are double ended, and are shown with their origins at the block centres, open arrow heads on the forward component of the vector, and solid arrow heads on the backward component of the vector. Such a vector field may arise when a camera pans smoothly across a scene. Even when a scene contains more complicated motion, it is common for significant portions of the motion vector field to be substantially uniform. When the vector field is uniform, the areas of source data referenced in the previous frame, 920, and in the next frame, 930, can be seen to tile precisely (that is, align with each other in a grid formation). (For clarity, FIG. 9 shows the positions of only a subset of the source data areas, 920 and 930).

FIG. 10a shows a largely uniform vector field but where an object 1000 is stationary in the foreground of block 1030. The example of FIG. 10a shows the desired output of a motion estimator in which, despite the occlusion (which has the potential to make motion estimation more difficult), it can be seen that the motion vectors such as 1010 in the blocks surrounding block 1030 are correct, and are consistent with a uniform motion of the background. In block 1030, the motion of the stationary object 1000 has been determined to be zero, and is illustrated with a small circle, 1020.

FIG. 10b shows the situation of FIG. 10a, but with a vector field that may be more typical of real motion estimators when faced with occlusion. Object 1000 is stationary in block 1030, giving rise to zero vector 1020. Motion vectors 1060 and 1070 are the result of spurious background to background matches, since the foreground object in block 1030 prevented a correct match being found. The background motion is horizontal, so blocks above and below block 1030 are unaffected by the presence of object 1000, and have been able to find the correct motion vectors.

FIG. 11 shows a situation in which flicker is particularly likely to occur. The background vector 1100 has been used in block 1110, and will therefore be considered, by many motion estimators, as a highly likely candidate for the motion in block 1150. When this vector is tested, as 1120, it will find a close match between pixel data in the general area 1130, in the previous frame, and pixel data in general area 1140 in the next frame. Vector 1120 is therefore highly likely to be selected as the motion vector of block 1150. The vector is of sufficient length to entirely span object 900, to which the motion estimator is, effectively, blind.

A zero vector may also be tested during motion estimation for block 1150, and may also give a good match. While a human viewer might realise that object 1000 should be rendered in front of the background (and therefore that the zero vector is the better choice), the motion estimator may lack the intelligence to correctly interpret the structure of the scene. Typical motion estimators contain a variety of weightings and biases, one of which may be to favour the selection of vectors which are more similar to their neighbours. This leads to improved consistency of vector fields, and is generally a good thing. Vector 1120, being similar to vector 1100, may be favoured over a zero vector which had not featured prominently in the vector field prior to the motion estimation of block 1150.

It can be seen that the blocks neighbouring 1150 still contain incorrect vectors, due to the occlusion, as before.

Returning to FIG. 9, an example of the flag marking technique is illustrated, in which an array or plane of indicator data is constructed with indicators or "flags" being set at locations determined by the motion vectors. Block 950 has vector 960, the ends of which point into neighbouring blocks. The backward portion of vector 960 points into block 940, which is therefore marked with an 'S' flag, indicating that it is the source of pixel data. The forwards portion of vector 960 points into block 970, which is therefore marked with a 'D' flag, indicating that it is the destination of pixel data. The sources and destinations of pixel data are, of course, in neighbouring frames, but both flags are set in a flag array corresponding to the current interpolated frame in this example. Due to the uniformity of the vector field, the vector in block 970 will result in an 'S' flag in block 950, and the vector in block 940 will result in a 'D' flag in block 950. When the process is continued over the whole vector field, the result will be that each block contains both 'S' and 'D' flags. Blocks with both 'S' and 'D' flags set are considered 'safe', with little chance of flickers. This is consistent with the characteristics of the uniform vector field, in which flickers are very unlikely.

In FIG. 10a, block 1030 contains 'D' and 'S' flags from the vectors in blocks 1040 and 1050 respectively. It also contains 'D' and 'S' flags from the zero vector 1020. Block 1030 is therefore considered 'safe'. Block 1040 contains only a 'D' flag, and block 1050 contains only an 'S' flag. Blocks with only a single type of flag are indicative of something interesting happening in the vector field, in this case, the occlusion caused by object 1000. A single type of flag in a block, however, does not give particular cause for concern, and is not indicative of a potential flicker.

FIG. 10b does not show flags, since the situation is very similar to FIG. 10a. Block 1030 will have 'S' and 'D' flags as a result of the zero vector 1020. Block 1080 will have a single 'D' flag, and block 1090 will have both 'S' and 'D' flags as a result of short vector 1060. There is nothing to indicate that a flicker is likely.

FIG. 11 shows 'S' and 'D' flags in the blocks to the left and right of block 1150, but no flags in block 1150. It is the absence of any flags in a block that indicates a potential flicker problem, and so block 1150 may be subject to alternative or additional processing in order to apply error concealment.

Various types of error concealment processing may be applied. In one example a non-motion compensated interpolation is used in areas where a high probability of error (e.g. a potential flicker problem) is indicated. This may simply comprise a weighted blend of pixel data from the next and previous frames, taken from block locations corresponding to the location of the interpolated block. This may be equivalent to a motion compensated interpolation where the motion vector is zero. As such, visual artefacts such as flicker, which arise due to an erroneous motion vector, are reduced. It should be noted that a zero motion vector is not necessarily correct either, although the visual impact of the use of the zero vector is generally relatively small. In another example, errors are concealed by discarding the estimated motion vector from an area where potential errors are indicated, and performing interpolation using a vector from an alternative source. The alternative vector may be a global motion vector, indicative of the general motion of a scene, or, it may be a vector produced by a different motion estimator. Some interpolation systems use a number of motion estimators, e.g. forwards and backwards single-ended estimators, and a double ended estimator. It is likely, when a probable error is indicated in the output of one motion estimator, that a lower probability of error will be indicated at a corresponding location in the output of at least one of the other motion estimators. In this case, the vector with the lower probability of error may be selected for use in interpolation.

In another example, errors in the motion compensated interpolation are concealed by applying a low pass filter to the output image, in the areas indicated by the flags. Spatial low pass filtering does not directly address temporal effects such as flicker, but may reduce the visibility of artefacts in, for example, the revealed areas of an occlusion, and may be useful in smoothing the transition between areas of different interpolation, for example, between motion compensated and non-motion compensated areas.

In other examples, error concealment may be applied by correcting, or by influencing the future estimation of the motion vector field. Re-estimating the motion vectors, using the arrays of indicators to provide prior knowledge of potentially difficult areas may be beneficial, but is expensive. Re-estimating individual blocks is also difficult as typical systems are highly pipelined and the indicators corresponding to an estimation block are not produced by the estimation of that block, but are projected into it as a result of the estimation of other blocks, according to their motion vectors. A motion estimator may propagate motion vectors both spatially within a frame, and temporally between frames, for use as candidates in subsequent motion estimations. As mentioned above, a bad vector in an occlusion area may provide a good pixel match. A conventional motion estimator may therefore propagate this vector, and it may continue to provide a good pixel match. The motion estimator's mechanisms for evaluating the vector may then be influenced by inappropriate positive feedback, giving rise to visual artefacts that persist over many frames. In one example of error concealment, motion vectors from blocks indicated as being potential sources of flicker are not propagated, or are weighted against in future motion estimations. In this way, an erroneous vector may cause a visual artefact in a single frame, but is prevented from causing a persistent artefact that is noticed by the viewer. In other examples, the arrays of indicators may be used as inputs to a more sophisticated system which identifies areas of occlusion in the scene, modelling the edges of objects and tracking their motion so as to guide motion estimation and conceal any errors that may arise.

A block with no flags set indicates a potential problem because it corresponds to an area of the scene for which pixel data is not being tracked. The block is neither the source of, nor the destination for, any pixel data. In the case of FIG. 11, it is the pixel data corresponding to object 1000 which is untracked. This leads to the untracked object 1000 being omitted from the interpolated image, and the result is a flicker.

Note that a block with multiple instances of a particular flag, such as block 1030 in FIG. 10a, may have no greater significance than a block with only a single instance of that flag. In one example, flags may be implemented as a pair of single flag bits per block, with one bit set to indicate at least one 'S', and the other bit set to indicate at least one 'D'. In such examples, t is not necessary to count the number of 'S' and 'D' instances. However, the number of 'S' and 'D' instances can be counted in other examples, as discussed in more detail below.

Typical vectors have resolution considerably higher than the block dimensions, often identifying the location of an area of reference pixel data with sub-pixel precision. Rounding can therefore be performed on the vector source and destination locations when determining where to set flags. In one example, vectors are simply rounded to the nearest block centre.

Figure 12:
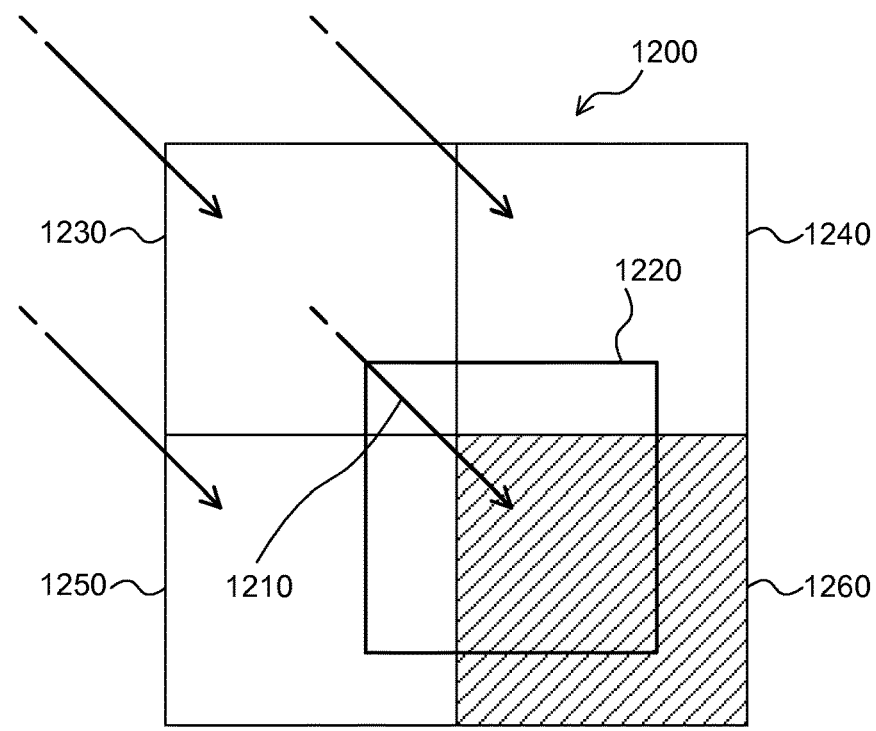
FIG. 12 shows an example of a motion vector being rounded to the nearest block.

FIG. 12 shows four blocks, 1200, with the destination ends of four motion vectors, e.g. 1210, shown. Square area 1220, centred at the end of vector 1210, shows the destination area in which a pixel data match was located by the motion estimator. Rounding the vector 1210 to the nearest block centre will identify block 1260, and a flag may be set in that block. It is clear, however, that all four blocks, 1230, 1240, 1250, and 1260, are, to some extent, destinations for the pixel data in area 1220. Therefore, in another example, destination flags would be set in each of the four blocks. This would result, in the case of a uniform vector field, in each block having its 'D' destination flag set four times, and also having its 'S' source flag set four times. However, in some examples, a count of the number of times each flag is set can be avoided, as noted above.

Figure 13:
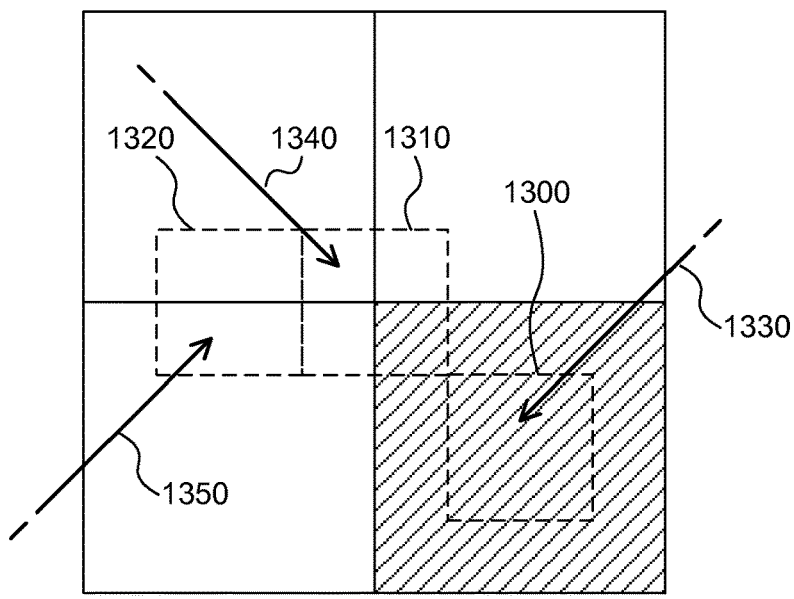
FIG. 13 shows a method of identifying blocks adjacent to the nearest block.

Another example is illustrated in FIG. 13. Here, blocks are divided into a number of 'landing zones', such as 1300, 1310, and 1320. A vector such as 1330, landing in the zone 1300 near the centre of a block, may set the flag for that block only. A vector such as 1340, landing in the zone at the corner of four blocks may set the flag in each of the four blocks. A vector such as 1350, landing in a zone on an edge shared by two blocks, may set the flag in each of the two blocks.

Figure 14:
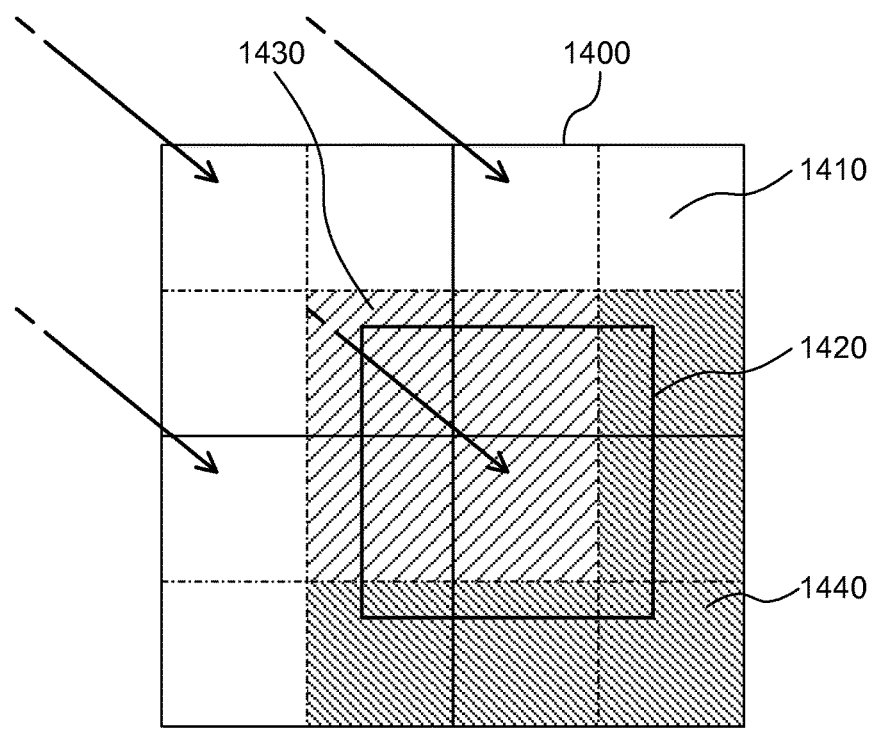
FIG. 14 shows an example of flags being set on a grid with higher resolution than the motion estimation grid.

In another example, flags are set on a grid with higher resolution than the motion estimation block grid. This may allow flags to be set at locations which better reflect the positions of the source and destination pixel data areas. This is illustrated in FIG. 14. In this example the flag grid (illustrated with dot-dashed lines) is at twice the resolution of the motion estimation grid. Each motion estimation block 1400 therefore contains four flag blocks 1410. In order to ensure that a uniform vector field sets flags in every flag block, flags should be set in at least four flag blocks corresponding to the pixel data area 1420. Rounding to the nearest four flag blocks would result in a flag being set in each of the flag blocks in shaded area 1430. Alternatively, flags may be set in every flag block which is wholly or partially overlapped by pixel data area 1420. This results in nine flags being set in each of the flag blocks in shaded area 1440.

It may be found that flicker detection is more effective when it operates more conservatively. That is, when the option exists, flags should be set in more blocks rather than fewer. The result is that there are fewer false positives, such as where slightly converging or diverging vectors would otherwise leave flags unset.

In the examples described above, flags have been set in blocks wholly or partially overlapped by the pixel data areas located at positions determined by the motion vectors. This results in a binary indication that flicker is either likely or unlikely. Referring back to FIG. 12, an example was given in which a flag was set four times in each of the blocks 1200. The technique may be adapted to give an indication with more than two levels by counting the number of times that each flag is set. In the case of FIG. 12, vector 1210 would cause a destination counter to be incremented for each of the four blocks 1200. After processing each vector in the uniform vector field, each block's destination counter would reach a count of four. Similarly, each block's source counter would reach a count of four. Where the motion vector field is not uniform, and particularly in areas of the image with occlusions, counts may reach a total of less than four. Analysis of each block's counters would then indicate the probability of flicker, with two zero counts indicating a high probability of flicker, and two counts of four indicating a very low probability of flicker. As with the binary flags, an imbalance between source and destination counts is not necessarily indicative of a problem, while two low count values suggests that flicker is likely.

In another example, blocks may store source and destination coverage values that are incremented in proportion to the extent to which the block is covered by the pixel data area indicated by the respective motion vector. In FIG. 12, it can be seen that the projected pixel data area 1220 covers approximately 8% of the area of block 1230. It also covers 17% of the area of block 1240, 23% of the area of block 1250, and 52% of the area of block 1260. Destination coverage values may therefore be incremented by the amounts 0.08, 0.17, 0.23, and 0.52 respectively. For a uniform vector field, the accumulated source and destination coverage amounts will be 1.0 for all blocks. Analysis is similar to the case of per-block counters. Flicker is indicated as likely when both coverage values are equal to, or close to zero, for a particular block.

In another example, the cost of implementing the technique is reduced by computing and storing only one flag or value. The stored flag or value may be derived using the techniques described above, either from the forwards component of the vector, to produce an array of destination flags or values, or from the backwards component, to produce an array of source flags or values. A higher probability of flicker is then indicated in those areas of the screen in which the flag is equal to zero, or in which the value is close to zero. As has been discussed, a single flag or value having a value of zero is a less reliable indicator of flicker than when both have a value of zero. Nevertheless, the cost saving achieved by computing and storing only a single flag is significant. The technique therefore has some merit, particularly when used in combination with other error detection methods.

In the examples above, a uniform vector field has been used to illustrate a situation in which all flags are set. In practical systems the edges of the image behave as occlusion areas where moving objects are either disappearing, or being revealed. Motion estimation is not performed beyond the edges of the image, and the absence of reference data outside the image edges may affect the performance of motion estimation in an area close to an edge of the image. The affected area depends on the direction and magnitude of the prevailing motion. Unlike the general case of occlusion, image edges are in known positions, and a motion estimator may be expected to produce reasonably accurate motion vectors up to the edge of the image. In one example the motion vector field close to the edge of the image, for which reference data is available, is extrapolated towards the image edges. In another example, the double-ended motion vector extrapolation may be guided by the results of a single-ended motion estimation, operating in either forwards or backwards direction such that the necessary reference data is available.

Figure 15:
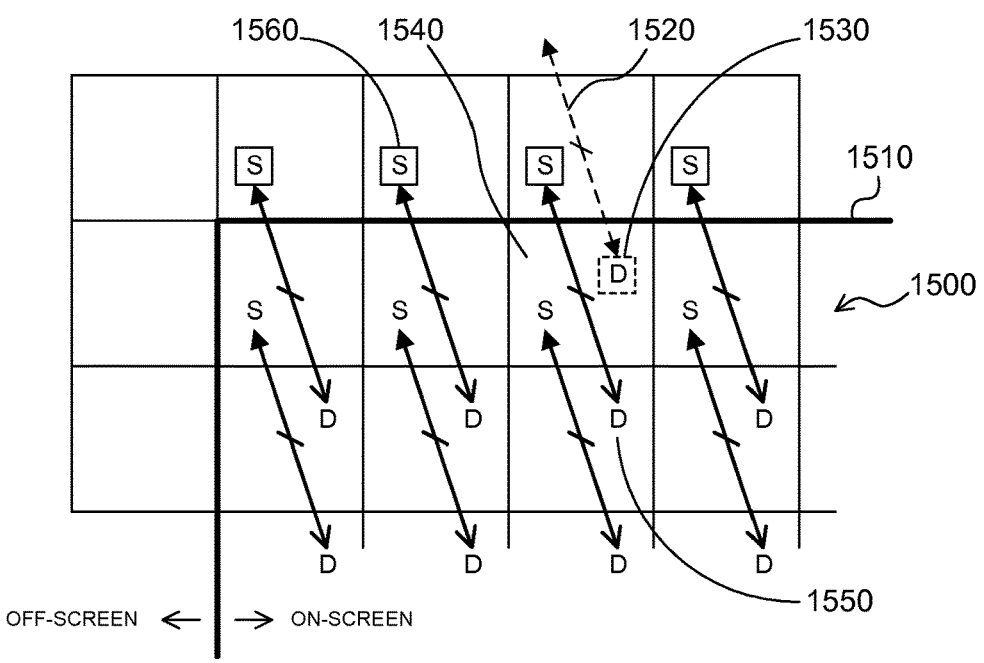
FIG. 15 shows an example of special handling being applied to blocks near the edge of the image.

FIG. 15 shows an example in which double-ended motion vector field 1500 has been extrapolated up to the image edge 1510. Vectors near the edge of the image project flags such as 1560 into the off-screen area where they have no effect. If off-screen vectors such as 1520 do not exist they cannot project flags such as 1530 back onto the image. The result is that blocks close to the image edges, such as 1540, may have only a single type of flag set. In one example, the extrapolation of vectors is continued such that off-screen vector 1520 is generated, and does project flag 1530 into block 1540. This is equivalent to extrapolating the on-screen flag values 1550 towards the edges of the image. In another example, no extrapolation is performed, and it is understood that blocks with only one flag set are to be expected near to the image edges. As has been described, a block with a single flag set does not normally require any particular action to be taken. Analysis of the motion vector field close to the edge of the image may be used to determine whether a block with no flags set indicates a genuine risk of flicker, or whether it would have had at least one flag set had the block not been near the image edge. Error concealment or other processing may then be applied in accordance with that determination.

Examples have been given in terms of a moving background and a static foreground object, which is reasonably common in real video when a camera tracks a moving object such that it remains central in the frame. The principles described herein do not require this arrangement, and will work equally with any relative motion, such as an object moving over a static background, or, a moving object and a moving background.

Several types of video processing system may benefit from the use of the error detection technique described above. One example is the motion compensated frame rate interpolator shown, simplified, in the block diagram of FIG. 16. In this system, a memory 1650 holds frame data 1620, which is supplied to a motion estimator 1610. The motion estimator computes motion vectors which, in this example, are also stored in the memory at 1630. An interpolator, 1640, receives frame data 1620 and vector data 1630 from which an interpolated output frame 1660 is derived.

Figure 16:
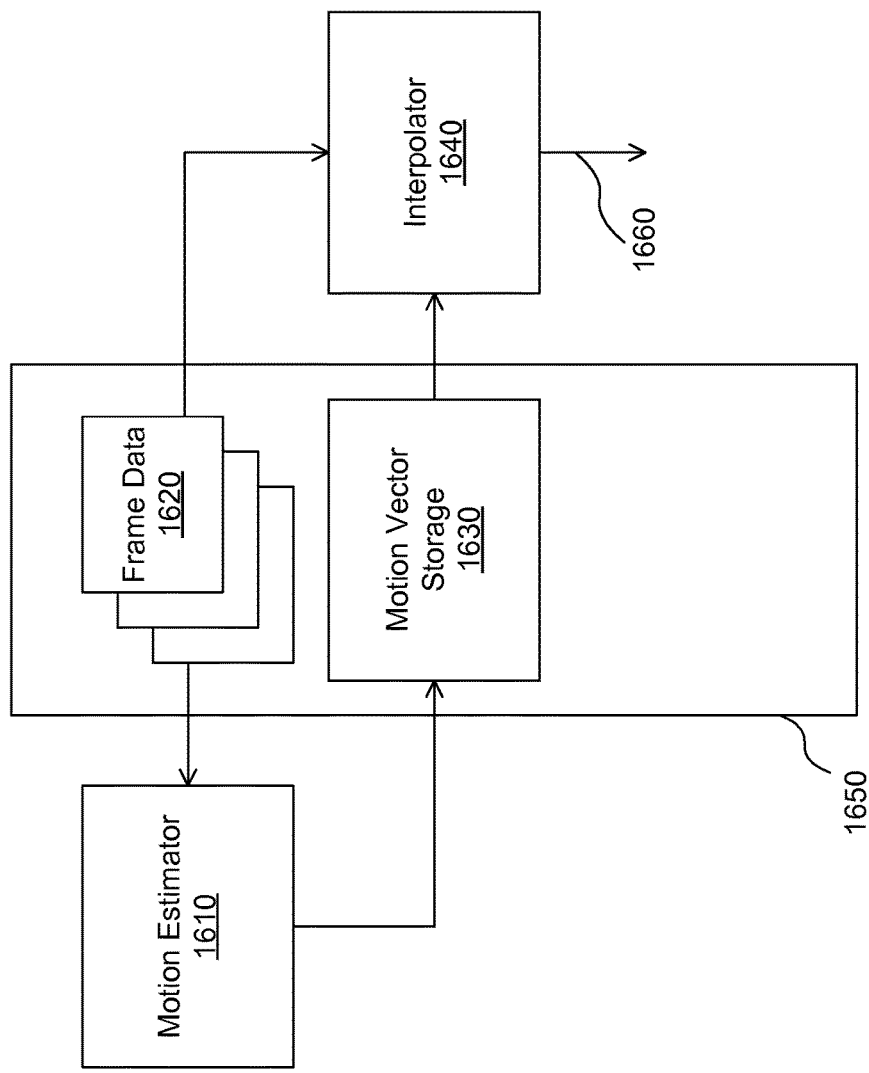
FIG. 16 shows a block diagram of a frame rate interpolation system.
Figure 17:
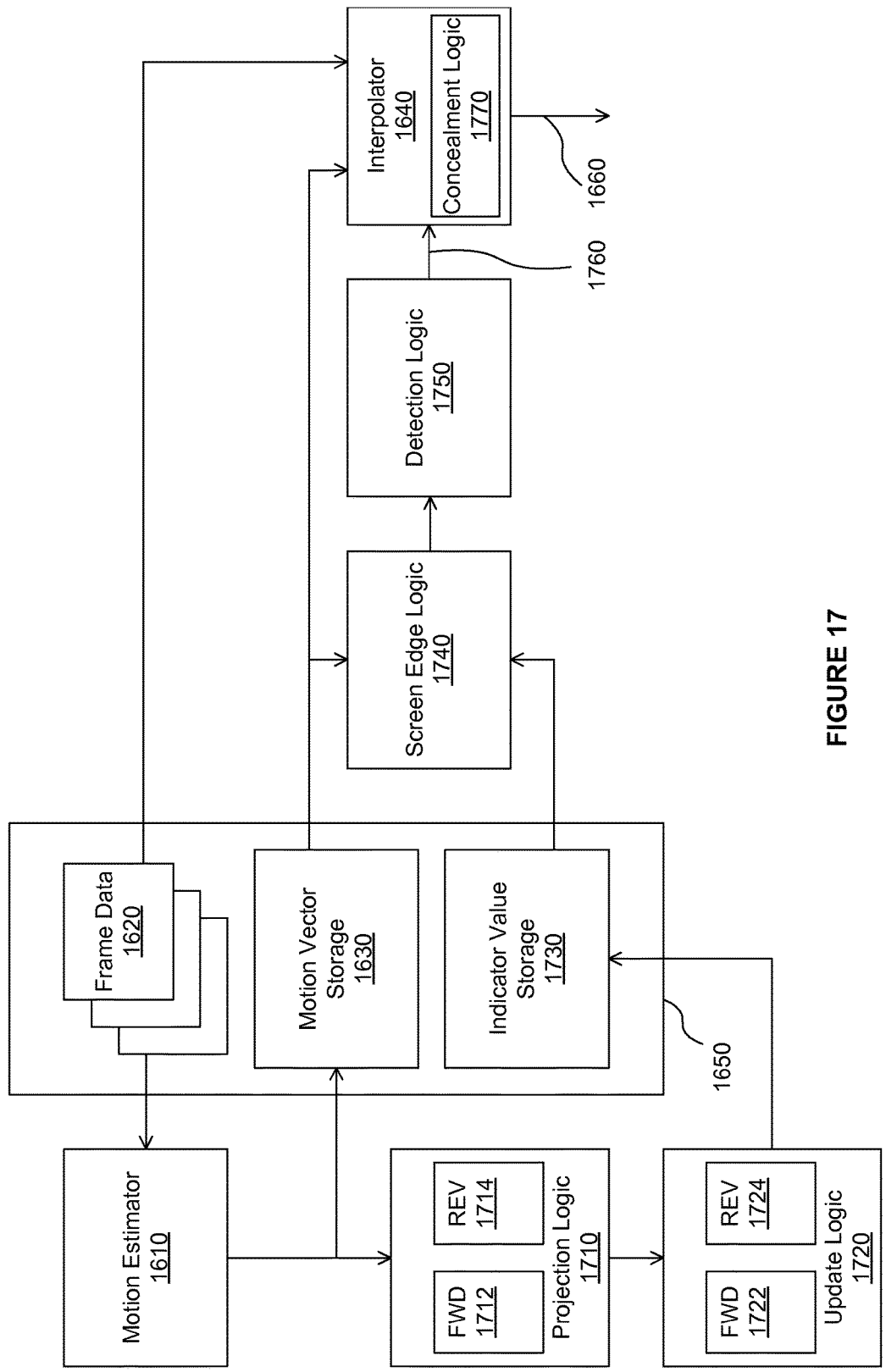
FIG. 17 shows a block diagram of a frame rate interpolation system adapted to use error detection.

FIG. 17 shows the motion compensated frame rate interpolator of FIG. 16 adapted to include additional components for performing error detection. Frame data 1620 is supplied to motion estimator 1610 which, in this example, produces double ended motion vectors. The motion vectors are stored at 1630, and are also supplied to projection logic 1710. The projection logic is shown with two sub-modules with similar functions. The forwards projection sub-module 1712 projects using the forwards component of the motion vector to derive a first indication block location (i.e. the "destination" block location), and the backwards projection sub-module 1714 projects using the backwards component of the motion vector to determine a second indication block location (i.e. the "source" block location). In an alternative implementation, projection logic 1710 may comprise only a single sub-module, which is configured to perform both projections.

The first and second indication block locations are sent to update logic 1720 which is connected to memory 1650, and which updates the values of the indicators stored at 1730. The update logic may also comprises two similar sub-modules: The forwards update sub-module 1722 updates indicator values associated with the first indication block location (e.g. destination or 'D' values), and the backwards indicator sub-module 1724 updates indicator values associated with the second indication block location (e.g. source or 'S' values). In an alternative implementation, a single sub-module may perform both updates.

The system of FIG. 17 includes optional screen edge logic 1740, which tests for vectors which point off the edge of the screen, and performs indicator extrapolation as required. FIG. 17 shows the screen edge logic operating on indicators as they are supplied to detection logic 1750, although an alternative implementation may return the extrapolated indicator values to memory 1650.

Detection logic 1750 examines one or more indicator values associated with an area of the image, and generates an error signal 1760. The error signal indicates a high probability of an error in the motion vector field at that location. The interpolator 1640 incorporates concealment logic 1770. The error signal is sent to interpolator 1640, where it is used by the concealment logic 1770 to modify the interpolation processing of frame data 1620 and motion vectors 1630, such that errors may be corrected or concealed in output image 1660.

Figure 18:
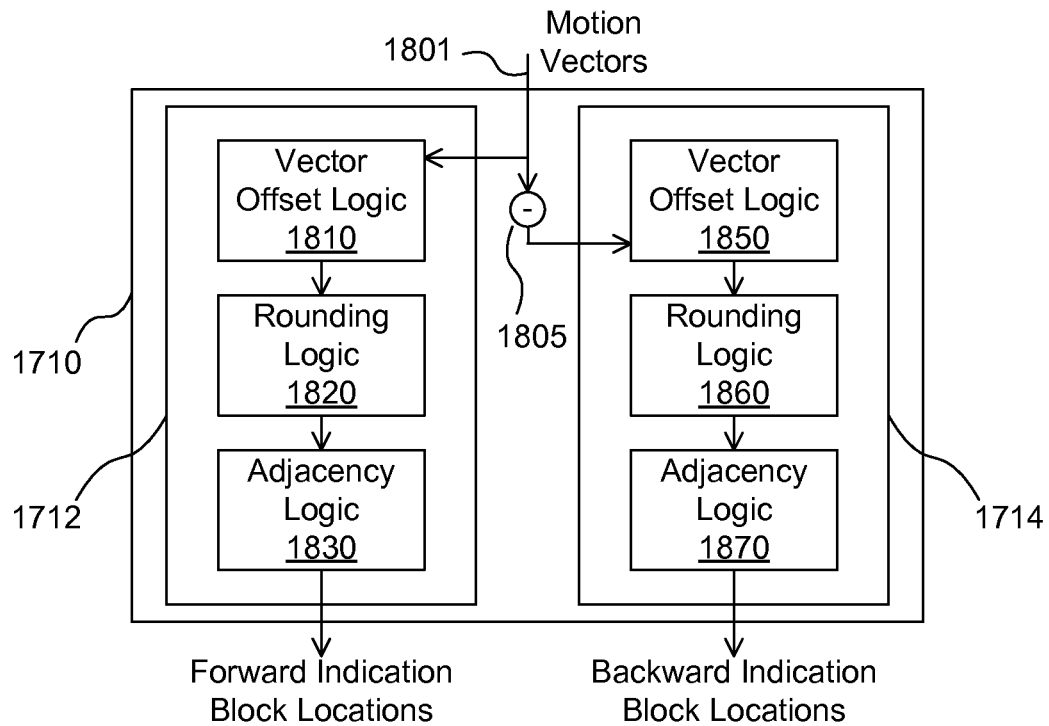
FIG. 18 shows a block diagram of one example of the vector projection logic.
Figure 19:
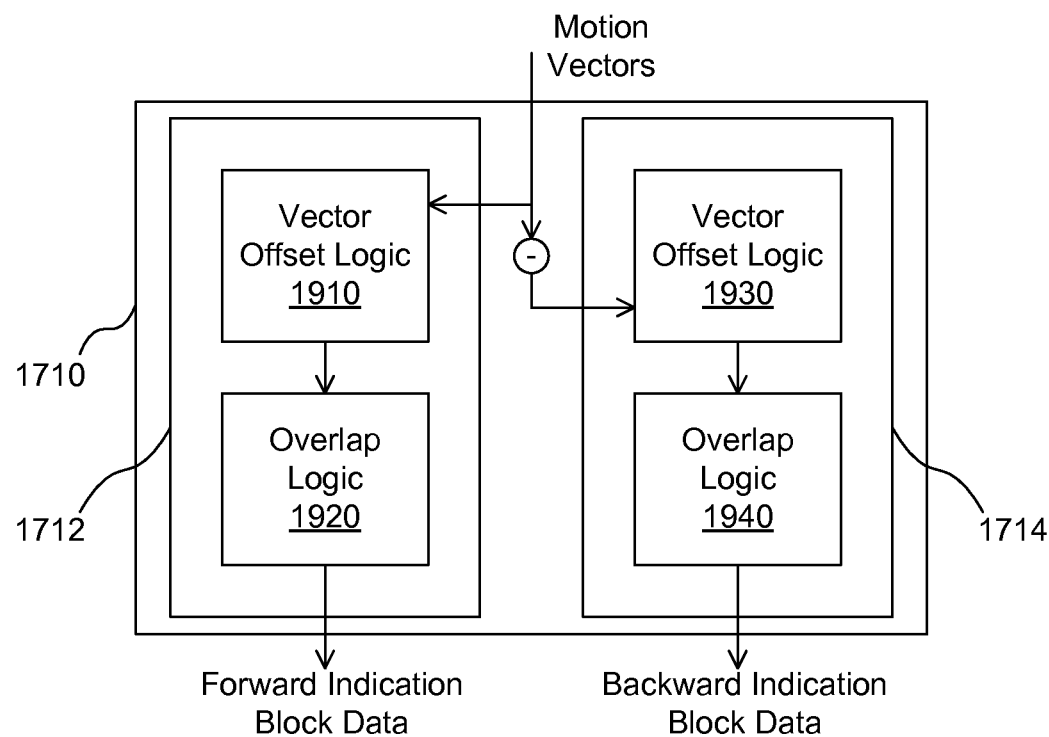
FIG. 19 shows a block diagram of another example of the vector projection logic.

FIGS. 18 and 19 show details of two example implementations of projection logic 1710. Each figure shows two sub-modules 1712 and 1714, as described above.

FIG. 18 shows an example implementation in which the forwards component 1801 of a double ended motion vector is supplied to vector offset logic 1810 in the forwards projection sub-module, and the same component is negated at 1805 to form the backwards component that is supplied to vector offset logic 1850 in the backwards projection sub-module. The components of a double ended vector are equal and opposite, and so it is convenient in some examples to store and transmit only one component and to derive the other component, where required, by negation.

Vector offset logic 1810 or 1850 adds the motion vector component to the current screen location to derive an offset block location. This is as illustrated by vector 1210 and offset block location 1220 in the example of FIG. 12. The offset location is then rounded to the nearest indication block location by rounding logic 1820 or 1860. The rounded indication block location is shown as 1260 in the example of FIG. 12. Finally, adjacency logic 1830 or 1870 determines any other indicator blocks adjacent to the rounded indicator block location for which an indicator update should also occur. The method of determining adjacent blocks may be one of the methods described above with reference to FIGS. 12 and 13. The determined forward and backward indication block locations are output to the update logic.

FIG. 19 shows an alternative example implementation of the projection logic 1710. Offset block locations are determined in the same way as in the example of FIG. 18, after which overlap logic 1920 or 1940 determines coverage values for each of the indication blocks overlapped by the offset block location. In the example of FIG. 12, described above, coverage values of 0.08, 0.17, 0.23, and 0.52 were determined for blocks 1230, 1240, 1250 and 1260 respectively. The overlapped indication block locations, and the coverage values, are output to the update logic.

Figure 20:
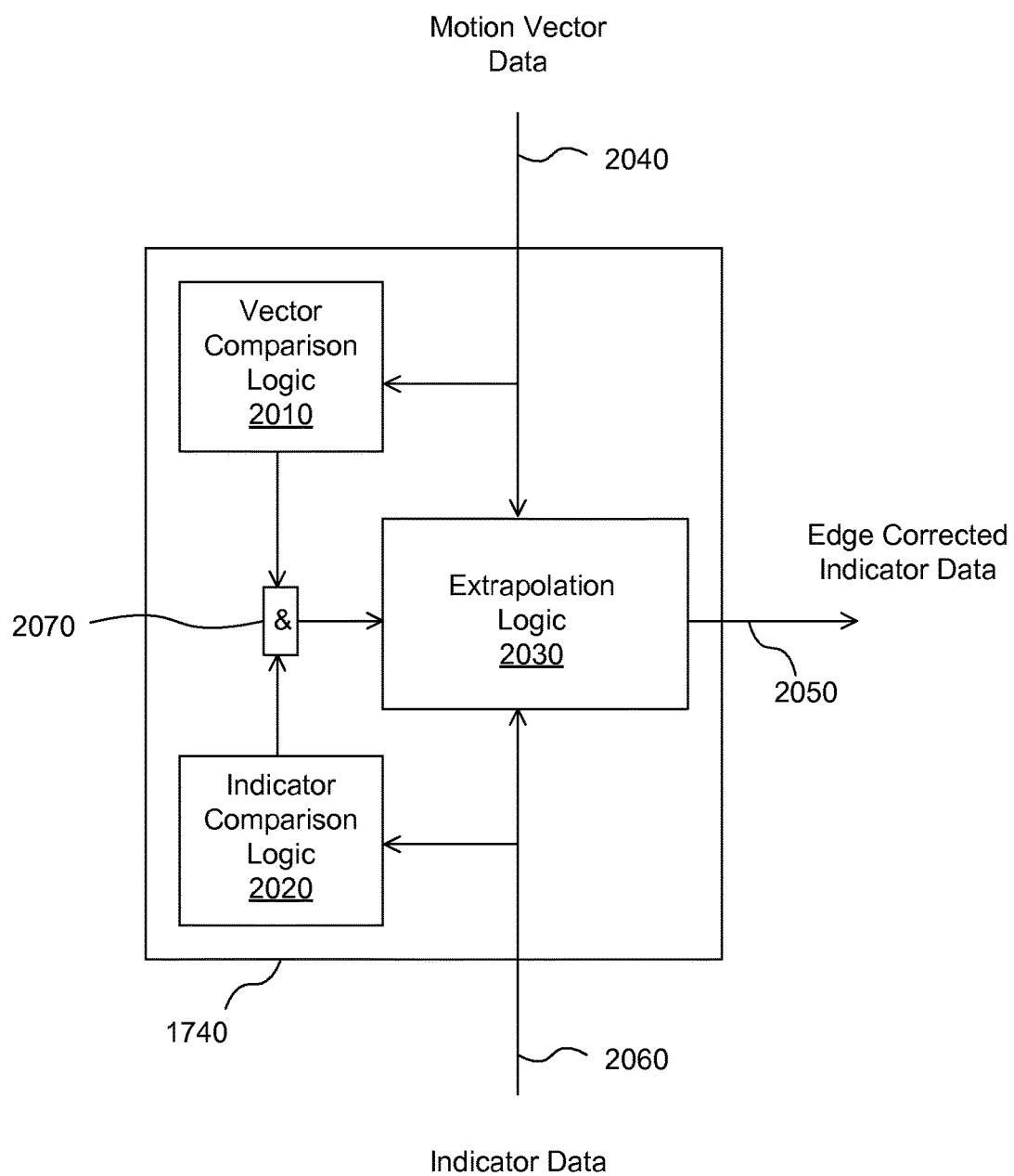
FIG. 20 shows a block diagram of an example of the screen edge logic.

FIG. 20 shows an example implementation of screen edge logic 1740. The screen edge logic receives motion vector data at 2010, and the vector comparison logic 2010 determines whether forward or backward components of a vector point off the edge of the screen. The determination comprises an offset calculation similar to that used in vector offset logic blocks 1810, 1850, 1910, or 1930, and although not shown in the figures, some common functionality may be shared between the projection logic and the screen edge logic. Indicator comparison logic 2020 takes indicator data 2060 corresponding to the location of a motion vector received at 2040, and determines whether it has been updated. When a vector points off-screen and a corresponding indicator has not been updated, logic 2070 signals to extrapolation logic 2030 that extrapolation is required. Extrapolation logic 2030 performs extrapolation of the indicator values to replace the indicator data 2060 with an extrapolated value, taken from an indication block location that does not correspond to an off-screen vector. The extrapolated indicator values which are output at 2050 are therefore less affected by proximity to the edge of the screen.

In various video coding standards, for example, H.264, "B-frames" are bi-directionally predicted. Each encoded block may choose to use either one or two reference frames. Where one reference frame is used the encoding is similar to that used in a uni-directionally predicted "P-frame". Where two reference frames are used, the prediction may be an average of reference pixels taken from one frame preceding the encoded frame, and from one frame following it. The vectors identifying the reference pixel areas in the two reference frames are not necessarily equal in length or co-linear, and motion estimation attempts to match pixel data in each of the reference frames with the pixel data in the block being encoded. As such, B-frame encoding differs significantly from the double-ended vector method described here, and should not be confused with it.

Generally, any of the functions, methods, techniques or components described above can be implemented in modules using software, firmware, hardware (e.g., fixed logic circuitry), or any combination of these implementations. The term "logic" is used herein to generally represent software, firmware, hardware, or any combination thereof.

In the case of a software implementation, the logic represents program code that performs specified tasks when executed on a processor (e.g. one or more CPUs). In one example, the methods described may be performed by a computer configured with software in machine readable form stored on a computer-readable medium. One such configuration of a computer-readable medium is signal bearing medium and thus is configured to transmit the instructions (e.g. as a carrier wave) to the computing device, such as via a network. The computer-readable medium may also be configured as a non-transitory computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The software may be in the form of a computer program comprising computer program code for configuring a computer to perform the constituent portions of described methods or in the form of a computer program comprising computer program code means adapted to perform all the steps of any of the methods described herein when the program is run on a computer and where the computer program may be embodied on a computer readable medium. The program code can be stored in one or more computer readable media. The features of the techniques described herein are platform-independent, meaning that the techniques may be implemented on a variety of computing platforms having a variety of processors.

Those skilled in the art will also realize that all, or a portion of the functionality, techniques or methods may be carried out by a dedicated circuit, an application-specific integrated circuit, a programmable logic array, a field-programmable gate array, or the like. For example, the logic may comprise hardware in the form of circuitry. Such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnects, by way of example. Such elements may be provided as custom circuits or standard cell libraries, macros, or at other levels of abstraction. Such elements may be interconnected in a specific arrangement. The logic may include circuitry that is fixed function and circuitry that can be programmed to perform a function or functions; such programming may be provided from a firmware or software update or control mechanism. In an example, hardware logic has circuitry that implements a fixed function operation, state machine or process.

It is also intended to encompass software which "describes" or defines the configuration of hardware that implements a module, functionality, component or logic described above, such as HDL (hardware description language) software, as is used for designing integrated circuits, or for configuring programmable chips, to carry out desired functions. That is, there may be provided a computer readable storage medium having encoded thereon computer readable program code for generating a processing unit configured to perform any of the methods described herein, or for generating a processing unit comprising any apparatus described herein. For example, a non-transitory computer readable storage medium may have stored thereon computer readable instructions that, when processed at a computer system for generating a manifestation of an integrated circuit, cause the computer system to generate a manifestation of a motion estimator as described in the examples herein. The manifestation of the motion estimator could be the motion estimator itself, or a representation of the motion estimator (e.g. a mask) which can be used to generate the motion estimator.

The term 'processor' and 'computer' are used herein to refer to any device, or portion thereof, with processing capability such that it can execute instructions, or a dedicated circuit capable of carrying out all or a portion of the functionality or methods, or any combination thereof.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It will be understood that the benefits and advantages described above may relate to one example or may relate to several examples.

Any range or value given herein may be extended or altered without losing the effect sought, as will be apparent to the skilled person. The steps of the methods described herein may be carried out in any suitable order, or simultaneously where appropriate. Aspects of any of the examples described above may be combined with aspects of any of the other examples described to form further examples without losing the effect sought.

The invention claimed is:

1. A method of error detection in a motion estimation system having an image space represented by a plurality of estimation blocks, and also being separately represented by a plurality of indication blocks, the method comprising:
   initialising, in a memory, a plurality of indicator values, wherein each indication block is associated with at least one of the indicator values;
   receiving a motion vector for a selected one of the estimation blocks;
   identifying an associated indication block from the location of the selected estimation block in said image space and a component of the received motion vector;
   modifying in the memory an indicator value associated with the identified indication block in dependence on said received motion vector;
   detecting a motion estimation error at an indication block by analysing the plurality of indicator values in said memory for that indication block; and
   performing error concealment at an estimation block associated with that indication block in dependence on said analysis.

2. The method according to claim 1, wherein the motion vector has a forwards component and a backwards component, and wherein identifying an indication block comprises:
   identifying the indication block from one of the forwards component or backwards component of the motion vector.

3. The method according to claim 2, wherein the method further comprises:
   identifying a further indication block from an opposite component of the motion vector to that used to identify the identified indication block.

4. The method according to claim 2, wherein each indicator block is associated with a first and second indicator value, and wherein modifying an indicator value in the memory associated with the identified indication block comprises:
   modifying the first indicator value associated with the identified indication block if the indication block was identified from the forwards component of the motion vector; and
   modifying the second indicator value associated with the identified indication block if the indication block was identified from the backwards component of the motion vector.

5. The method according to claim 4, wherein analysing the plurality of indicator values to detect a motion estimation error at an associated indication block comprises determining that both the first indicator value and the second indicator value for the associated indication block satisfy a predefined condition.

6. The method according to claim 4, wherein the first and second indicator values are one bit flags, and wherein analysing the plurality of indicator values to detect a motion estimation error comprises determining that the first indicator value flag is not set and the second indicator value flag is not set.

7. The method according to claim 1, wherein each indicator value is a counter and modifying the indicator value comprises updating the counter.

8. The method according to claim 1, wherein identifying an indication block comprises deriving a location by adding the component of the motion vector to the location of the estimation block.

9. The method according to claim 8, wherein identifying an indication block further comprises rounding the derived location to the nearest indication block.

10. The method according to claim 1, wherein the indication block is identified from the location of the selected estimation block and only one component of the motion vector; and wherein the motion estimation error is detected in dependence on only one indicator value at the associated indication block.

11. An error detector in a motion estimation system having an image space represented by a plurality of estimation blocks, and also being separately represented by a plurality of indication blocks, the error detector comprising:
   a memory configured to store a plurality of indicator values, wherein each indication block is associated with at least one of the indicator values;
   an input configured to receive a motion vector for a selected one of the estimation blocks;
   projection logic configured to identify an associated indication block from the location of the selected estimation block in said image space and a component of the received motion vector;
   update logic coupled to the memory and configured to modify an indicator value in the memory associated with the identified indication block in dependence on said received motion vector;
   detection logic configured to detect a motion estimation error at an indication block by analysing the plurality of indicator values in said memory for that indication block; and
   concealment logic configured to perform error concealment at an estimation block associated with that indication block in dependence on the detected motion estimation error.

12. The error detector according to claim 11, wherein the motion vector has a forwards component and a backwards component, and wherein the projection logic is configured to identify the indication block from one of the forwards component or backwards component of the motion vector.

13. The error detector according to claim 12, wherein the projection logic is further configured to identify a further indication block from an opposite component of the motion vector to that used to identify the identified indication block.

14. The error detector according to claim 12, wherein each indicator block is associated with a first and second indicator value, and wherein the update logic is configured to:
   modify the first indicator value in the memory associated with the identified indication block if the indication block was identified from the forwards component of the motion vector; and
   modify the second indicator value in the memory associated with the identified indication block if the indication block was identified from the backwards component of the motion vector.

15. The error detector according to claim 14, wherein the detection logic is configured to detect a motion estimation error at an associated indication block by determining that both the first indicator value and the second indicator value for the associated indication block satisfy a predefined condition.

16. The error detector according to claim 14, wherein the first and second indicator values are one bit flags, and wherein the detection logic is configured to detect a motion estimation error at an associated indication block by determining that the first indicator value flag is not set and the second indicator value flag is not set.

17. The error detector according to claim 11, further comprising screen edge logic, wherein the screen edge logic comprises:
   vector comparison logic configured to determine a first set of indication blocks at least partially overlapping in the image space with estimation blocks having a motion vector with a component that points outside the image space, and
   a second set of indication blocks at least partially overlapping in the image space with estimation blocks having a motion vector with a corresponding component that does not point outside the image space; and
   extrapolation logic configured to copy at least a portion of the indicator values associated with the second set of indication blocks into the corresponding indicator values associated with the first set of indication blocks.

18. The error detector according to claim 11, further comprising screen edge logic, wherein the screen edge logic comprises vector comparison logic configured to determine a set of indication blocks at least partially overlapping in the image space with estimation blocks having a motion vector with a component that points outside the image space; and
   wherein the detection logic is configured to disregard unmodified indicator values associated with the set of indication blocks.

19. A non-transitory computer readable storage medium having stored thereon processor executable instructions that when executed cause at least one processor to, in a motion estimation system having an image space represented by a plurality of estimation blocks, and also being separately represented by a plurality of indication blocks:
   initialise, in a memory, a plurality of indicator values, wherein each indication block is associated with at least one of the indicator values;
   receive a motion vector for a selected one of the estimation blocks;
   identify an associated indication block from the location of the selected estimation block in said image space and a component of the motion vector;
   modify an indicator value in the memory associated with the identified indication block in dependence on said received motion vector;
   detect a motion estimation error at an indication block by analysing the plurality of indicator values in said memory for that indication block; and
   performing error concealment at an estimation block associated with that indication block in dependence on said analysis.

20. A non-transitory computer readable storage medium having stored thereon computer readable instructions that, when processed at a computer system for generating a manifestation of an integrated circuit, cause the computer system to generate a manifestation of an error detector in a motion estimation system having an image space represented by a plurality of estimation blocks, and also being separately represented by a plurality of indication blocks, the error detector comprising:
   a memory configured to store a plurality of indicator values, wherein each indication block is associated with at least one of the indicator values;
   an interface configured to receive a motion vector for a selected one of the estimation blocks;
   projection logic configured to identify an associated indication block from the location of the selected estimation block in said image space and a component of the received motion vector;
   update logic coupled to the memory and configured to modify an indicator value in the memory associated with the identified indication block in dependence on said received motion vector;

detection logic configured to detect a motion estimation error at an indication block by analysing the plurality of indicator values in said memory for that indication block; and concealment logic configured to perform error concealment at an estimation block associated with that indication block in dependence on the detected motion estimation error.

\* \* \* \* \*